(12) United States Patent
Cahill

(10) Patent No.: US 9,017,219 B2
(45) Date of Patent: Apr. 28, 2015

(54) SYSTEMS AND METHODS FOR AIRCRAFT BRAKING AND TAXIING

(75) Inventor: Eric D. Cahill, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 93 days.

(21) Appl. No.: 13/463,597

(22) Filed: May 3, 2012

(65) Prior Publication Data

US 2013/0292992 A1    Nov. 7, 2013

(51) Int. Cl.
*B64C 25/42* (2006.01)
*F16H 48/06* (2006.01)
*B64C 25/40* (2006.01)
*B64C 25/44* (2006.01)

(52) U.S. Cl.
CPC .............. *B64C 25/405* (2013.01); *B64C 25/44* (2013.01); *Y02T 50/823* (2013.01)

(58) Field of Classification Search
USPC .......... 244/111, 50; 477/9, 170; 475/157, 154
See application file for complete search history.

(56) References Cited

U.S. PATENT DOCUMENTS

| | | | |
|---|---|---|---|
| 2006/0226698 A1* | 10/2006 | Riebe et al. | 303/20 |
| 2007/0119678 A1* | 5/2007 | Houle et al. | 192/69.8 |
| 2009/0294577 A1* | 12/2009 | Roques et al. | 244/50 |
| 2010/0252675 A1* | 10/2010 | Malkin et al. | 244/50 |
| 2011/0132704 A1* | 6/2011 | Hanlon et al. | 188/156 |
| 2011/0156472 A1 | 6/2011 | Bucheton | |
| 2011/0233328 A1 | 9/2011 | Alleau | |
| 2012/0126053 A1* | 5/2012 | Christensen et al. | 244/50 |

* cited by examiner

*Primary Examiner* — Gene Crawford
*Assistant Examiner* — Lillian Nguyen
(74) *Attorney, Agent, or Firm* — Snell & Wilmer, L.L.P.

(57) ABSTRACT

Systems and methods are disclosed for aircraft braking and taxiing systems for use in, for example, an aircraft. In this regard, system comprising an electric motor coupled to a first transmission, a first clutch for selectively engaging the first transmission to a propulsion transmission and a brake clamping system, wherein, in response to engagement with the propulsion transmission, the electric motor drives an aircraft wheel, wherein, in response to engagement with the actuator ram, the electric motor drives the brake clamping system to apply force to an aircraft brake disk stack.

16 Claims, 7 Drawing Sheets

SYSTEMS AND METHODS FOR AIRCRAFT BRAKING AND TAXIING

FIELD

The present disclosure is related to systems and methods for aircraft braking and taxiing.

BACKGROUND

Aircraft often include a braking system that slows the aircraft wheels. Aircraft braking systems are used, for example, during a landing operation or a rejected takeoff ("RTO"). Many aircraft use jet engines or propellers to provide the force needed to taxi (i.e., move the aircraft while on the ground). Taxiing is useful for aircraft travel while on the ground, for example, taxiing to and from a gate and a runway. Jet engines are not as fuel efficient in such low speed applications, resulting in relatively high fuel consumption and excess noise. Thus, there is a need for systems and methods to address these issues, among others.

SUMMARY

Systems and methods disclosed herein may be useful for use in aircraft braking and taxiing. In this regard, a system is provided comprising an electric motor coupled to a first transmission, and a first clutch for selectively engaging the first transmission to a propulsion transmission and a brake clamping system. In response to engagement with the propulsion transmission, the electric motor drives an aircraft wheel. In response to engagement with the actuator ram, the electric motor drives the brake clamping system to apply force to an aircraft brake disk stack.

In various embodiments, a system is provided comprising an aircraft wheel comprising a mating portion for mating with a propulsion transmission, the aircraft wheel coupled to an aircraft brake, the aircraft brake comprising a brake clamping system for selectively engaging a brake disk stack, a rotating member, a first clutch for selectively engaging the rotating member to at least one of the propulsion transmission and the brake clamping system.

In various embodiments, a method is provided comprising stopping an electric motor, the electric motor coupled to a first transmission, disengaging a first clutch to decouple the first transmission from a brake clamping system, and engaging the first clutch to couple the first transmission to the propulsion transmission.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
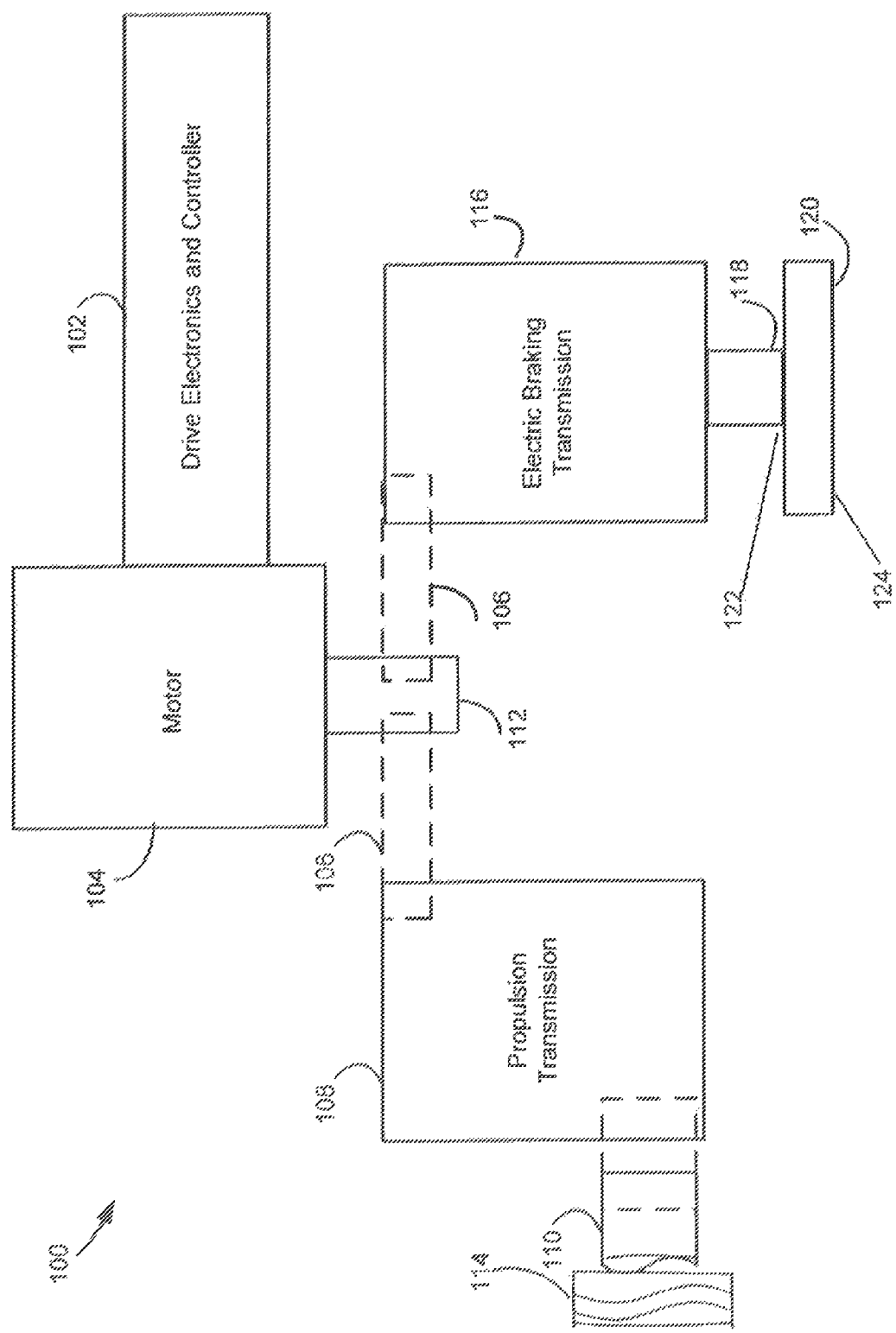
FIG. 1 illustrates a braking and taxiing system in accordance with various embodiments.

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in different orders and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for braking and taxiing systems for use in aircraft. Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may have front and rear axial ends and alternating rotor and stator disks mounted with respect to the wheel support and wheel for relative axial movement. Each rotor disk may be coupled to the wheel for rotation therewith and each stator disk is coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like.

In electronic brakes, a brake controller (also referred to as a brake control unit) is coupled to one or more electromechanical actuator controllers ("EMAC") for a brake, which drives one or more electromechanical brake actuators. The brake controller may be in communication with a brake pedal, and thus may control the EMAC in accordance with pilot/copilot braking commands. Electromechanical brake actuators may be in physical communication with a brake clamping system. A brake clamping system may provide force to clamp a brake disk stack 124. For example, a brake clamping system may comprise a rotary force to linear force converter, such as a ballscrew. A ballscrew typically received rotational force input and converts the rotational force into a linear force. The ballscrew may thus receive rotational input from the electromechanical brake actuators and, in response, linearly drive rams 122 into the brake disk stack 124, thus effecting braking. A brake clamping system may also comprise a brake transmission to condition torque input to be of suitable magnitude and velocity for the ballscrew.

In various embodiments, an aircraft braking and taxiing system is provided. A braking and taxiing system may provide taxi functionality and braking functionality. In this manner, an electric motor may be used to both effect braking and propel the aircraft during taxiing. In various embodiments, a single electric motor is used to both effect braking and propel the aircraft during taxiing, thus saving weight and cost. In that regard, the electric motor may toggle between providing braking and providing taxiing and, in various embodiments, a neutral position where the electric motor is not engaged to provide either braking or taxiing. It is believed that there would not be a need for an aircraft that is capable of both braking and taxiing at the same time. Indeed, such ability would be inherently counterproductive. Thus, the braking and taxiing functionalities may be driven by a common electric motor or electric motors. Various embodiments reduce weight, as it eliminates the need for two sets of electric motors: one set for braking and one set for taxiing. Moreover, various embodiments reduce testing requirements, as only a single system is tested instead of two. This reduces the cost of testing and reduces time to deploy such a system.

A braking and taxiing system may provide taxiing capability to the aircraft. A braking and taxiing system may comprise one or more electric motors that, through various gear trains (i.e., transmissions), drive the wheels of an aircraft. In this manner, taxiing may be accomplished in a more energy efficient manner with reduced noise. In that regard, a braking and taxiing system may be designed to use a relatively low torque output electric motor coupled to one or more transmissions having high gear ratios, which produce a relatively higher torque output than the input torque. Thus, a braking and taxiing system may be designed with smaller, lighter weight motors that are capable of driving an aircraft, and particularly, larger jet aircraft.

A braking and taxiing system may provide braking capability. An electric motor may, through one or more transmissions, engage a brake clamping system to place a brake disk stack into forceful engagement, thus effecting braking. In that regard, the electric motor may, through one or more transmissions, engage a force converter such as a ballscrew. In various embodiments, the electric motor, through a transmission, engages a second transmission which in turn engages a brake clamping system.

With reference to FIG. 1, braking and taxiing system 100 is shown in accordance with various embodiments. Drive electronics controller 102 is shown in electrical communication with motor 104. Drive electronics controller 102 may comprise hardware and/or software that implement logic to control motor 104. Drive electronics controller 102 may comprise a computer readable, non-transitory storage medium. Drive electronics controller 102 may also comprise electronic drivers that provide drive signals to motor 104. Motor 104 comprises an electric motor. Motor 104 may comprise any suitable electric motor such as a brushless DC motor. Brushed DC motors and brushless AC motors are also contemplated herein.

Motor 104 may be coupled to high gear ratio transmission 112 (as also referred to as a rotating member 112). High gear ratio transmission 112 may comprise a gear train that has a high gear ratio. A high gear ratio as used herein may be from about 30:1 to about 110:1, more preferably from about 40:1 to about 80:1, and more preferably about 50:1. As described below, a high gear ratio transmission may have a variable final gear ratio, so the high gear ratio transmission may vary from one ratio to another depending upon configuration. Any high gear ratio transmission that has at least one final gear ratio from about 30:1 to about 11.0:1 may be considered a high gear ratio transmission, even though the high gear ratio transmission may be adjusted to variably have a gear ratio outside such range. In such a manner, a gear ratio of 50:1 may receive a torque input $\tau_1$ of 3 Nm and produce torque output $\tau_0$ of 150 Nm. The use of a high gear ratio transmission thus enables the use of lower torque producing motors to produce higher torque outputs. The power and torque output of motor 104 may thus be selected in accordance with anticipated loads and gear ratios used, among other considerations.

High gear ratio transmission 112 may be coupled to propulsion transmission 108 via clutch 106. Clutch 106 may comprise any suitable clutch. Clutch 106 selectively engages and disengages high gear ratio transmission 112 from propulsion transmission 108. In various embodiments, high gear ratio transmission 112 and propulsion transmission 108 mate via meshing gears, though other suitable mechanical matings are contemplated herein. Clutch 106 may be mechanically actuated (ie, selectively engaged and disengaged) or may be actuated using hydraulics or electronics such as a transmission solenoid. Clutch 106 may be mechanically actuated in response to one or more gear teeth sensors that detect the position of gear teeth and thus are able to determine when two or more gears align. One or more sensors may also be used to detect when clutch 106 is engaged to help ensure that clutch 106 is not engaged in conditions when it should not be engaged.

Propulsion transmission 108 may comprise any suitable gear train for aircraft propulsion. In various embodiments, propulsion transmission 108 has a lower gear ratio than high gear ratio transmission 112, though in certain embodiments, propulsion transmission 108 may have a higher gear ratio than high gear ratio transmission 112.

Propulsion transmission 108 is coupled to aircraft wheel 114 via clutch 110. Clutch 110 may comprise any suitable clutch. Clutch 110 selectively engages and disengages propulsion transmission 108 from aircraft wheel 114. Clutch 110 may be mechanically actuated (ie, selectively engaged and disengaged) or may be actuated using hydraulics or electronics such as a transmission solenoid. Clutch 110 may be mechanically actuated in response to one or more gear teeth sensors that detect the position of gear teeth and thus are able to determine when two or more gears align. One or more sensors may also be used to detect when clutch 110 is engaged to help ensure that clutch 110 is not engaged in conditions when it should not be engaged.

In various embodiments, propulsion transmission 108 and aircraft wheel 114 may mate via meshing gears, though other suitable mechanical matings are contemplated herein. Aircraft wheel 114 may include one or more gear teeth along an interior circumference adjacent to or close to the aircraft wheel tire. To increase torque, it is desirable for the mating of the propulsion transmission 108 and aircraft wheel 114 to occur at a point as far from the rotational axis of the aircraft wheel as possible.

Aircraft wheel 114 has a mating portion that may mate to propulsion transmission 108 to transmit rotational force from propulsion transmission 108 to aircraft wheel 114. In the illustrated embodiment, the mating portion of aircraft wheel 114 is a geared portion along the circumference of aircraft wheel 114. However, in various embodiments the mating portion of aircraft wheel 114 may comprise any other suitable mating portion.

In various embodiments, propulsion transmission 108 may mate with an aircraft tire or both the aircraft tire and aircraft wheel. An aircraft tire may have a mating portion to engage propulsion transmission 108. The mating portion of an aircraft tire may be a portion of the tire tread. In various embodiments, a connecting structure such as a support structure may link propulsion transmission 108 with the aircraft tire. For example, propulsion transmission 108 may engage with a support structure that is engaged with the tread of the aircraft tire, either directly or through another component. The propulsion transmission 108 may transmit torque via the support structure to the aircraft tire. In this regard, the effective torque arm is increased, as the aircraft tire has a larger radius than the radius of the aircraft wheel. In various embodiments, a support structure is in contact with both an aircraft tire and aircraft wheel.

In various embodiments, the support structure may comprise a support and a roller. The roller may be engaged, either fixedly or selectively, with the tread of a tire. The roller may comprise gear teeth for engagement with the tire tread. The roller's rotational motion may then be transmitted to the tire and, thus, cause rotation of the wheel and tire assembly. The support may extend from the propulsion transmission in a radial direction. The roller may be attached to the support via suitable means to allow for rotational force to be transmitted through the support to the roller.

In various embodiments, the roller engages with the tire tread and remains fixed therein. The propulsion transmission transfers force to the support, which, in turn, drives the roller and causes tire rotation.

Figure 7:
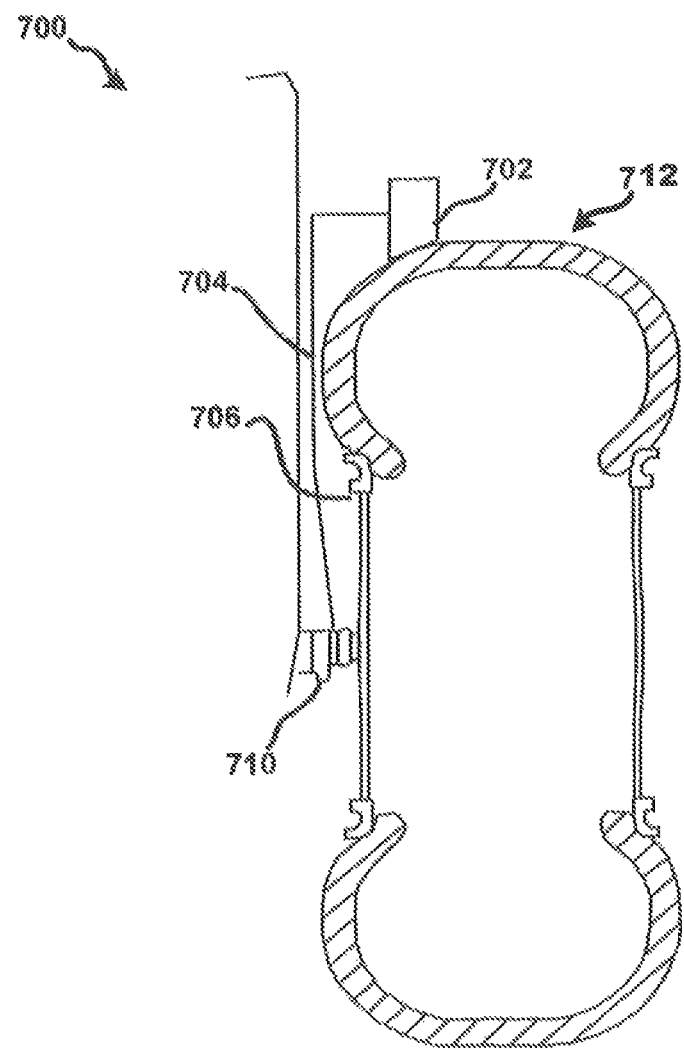
FIG. 7 illustrated a braking and taxiing system including a tire interface in accordance with various embodiments.

With reference to FIG. 7, tire and wheel assembly 700 is shown. Tire 712 is mounted to wheel 706. Support 704 extends from propulsion transmission 710 to an area near the tread of tire 712. Roller 702 is coupled to support 704. Roller 702 is engaged with the tread of tire 712 so that rotation of roller 702 may effect rotation of tire 712. Propulsion transmission 710 transmits force through support 704 to roller 702. Roller 702 may then rotate, thereby transmitting torque to tire 712.

With reference back to FIG. 1, high gear ratio transmission 112 may be coupled to brake transmission 116 via clutch 106. Clutch 106 selectively engages and disengages high gear ratio transmission 112 from brake transmission 116. In various embodiments, high gear ratio transmission 112 and brake transmission 116 may mate via meshing gears, though other suitable mechanical matings are contemplated herein. Clutch 106 may be mechanically actuated (ie, selectively engaged and disengaged) or may be actuated using hydraulics or electronics such as a transmission solenoid. Clutch 106 may be mechanically actuated in response to one or more gear teeth sensors that detect the position of gear teeth and thus are able to determine when two or more gears align.

Clutch 106 may be actuated to momentarily separate high gear ratio transmission 112 from other components. Clutch 106 may be engaged in one of three positions. In a first position, clutch 106 is engaged with brake transmission 116. In a second position, clutch 106 is engaged with propulsion transmission 108. In a third position, clutch 106 is in a neutral position. A neutral position may be a position where high gear ratio transmission 112 is not mechanically coupled to another component. Thus, in a neutral position, high gear ratio transmission 112 is allowed to spin freely.

Brake transmission 116 may be coupled to ballscrew 118. Ballscrew 118 receives rotational force from brake transmission 116 and converts the rotational force to linear force. The linear force may be applied to pressure plate 120 of an aircraft brake. Brake transmission 116 and ballscrew 118 comprise a brake clamping system.

The output of motor 104 may be selected in accordance with the force needed to move an aircraft. For example, the force required to move an aircraft may be represented by the below, equation, where N is the normal force (weight of aircraft) and μ is the rolling resistance of the aircraft:

$$F = \mu \cdot N$$

For an 80,000 kg aircraft with a rolling resistance of 0.01, F=800 kgf. This force may be divided by the number of wheels of the aircraft that contain a braking and taxiing system. For example, an aircraft may have four wheels, each with a parking brake system. Thus, each tire must exert 200 kgf of force for the aircraft to move in response to the parking brake being disengaged. For an aircraft tire with a 0.5 m radius, the torque required to produce 200 kg is about 980 Nm. The gear ratios of high gear ratio transmission 112 and the propulsion transmission 108 and the torque of motor 104 may be selected to overcome such force.

Figure 2:
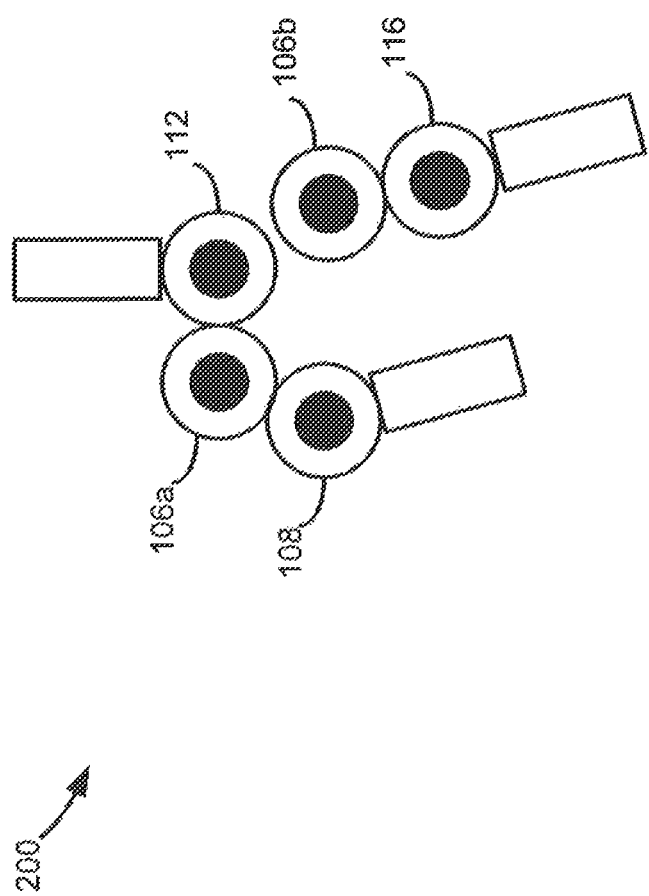
FIG. 2 illustrates an expanded view of a portion of the a braking and taxiing system of FIG. 1, in accordance with various embodiments.

With reference to FIG. 2, clutch assembly 200 is shown. Clutch assembly 200 is an expanded view of the coupling between high gear ratio transmission 112, propulsion transmission 108, and brake transmission 116. The rotational output of motor 104 drives high gear ratio transmission 112 and, thus, high gear ratio transmission 112 receives torque input from motor 104. Clutch gear 106*a* is shown engaged with high gear ratio transmission 112 and propulsion transmission 108. Clutch gear 106*a* is selectively actuated, so clutch gear 106*a* may be disengaged to remove high gear ratio transmission 112 from contact with propulsion transmission 108.

Figure 3:
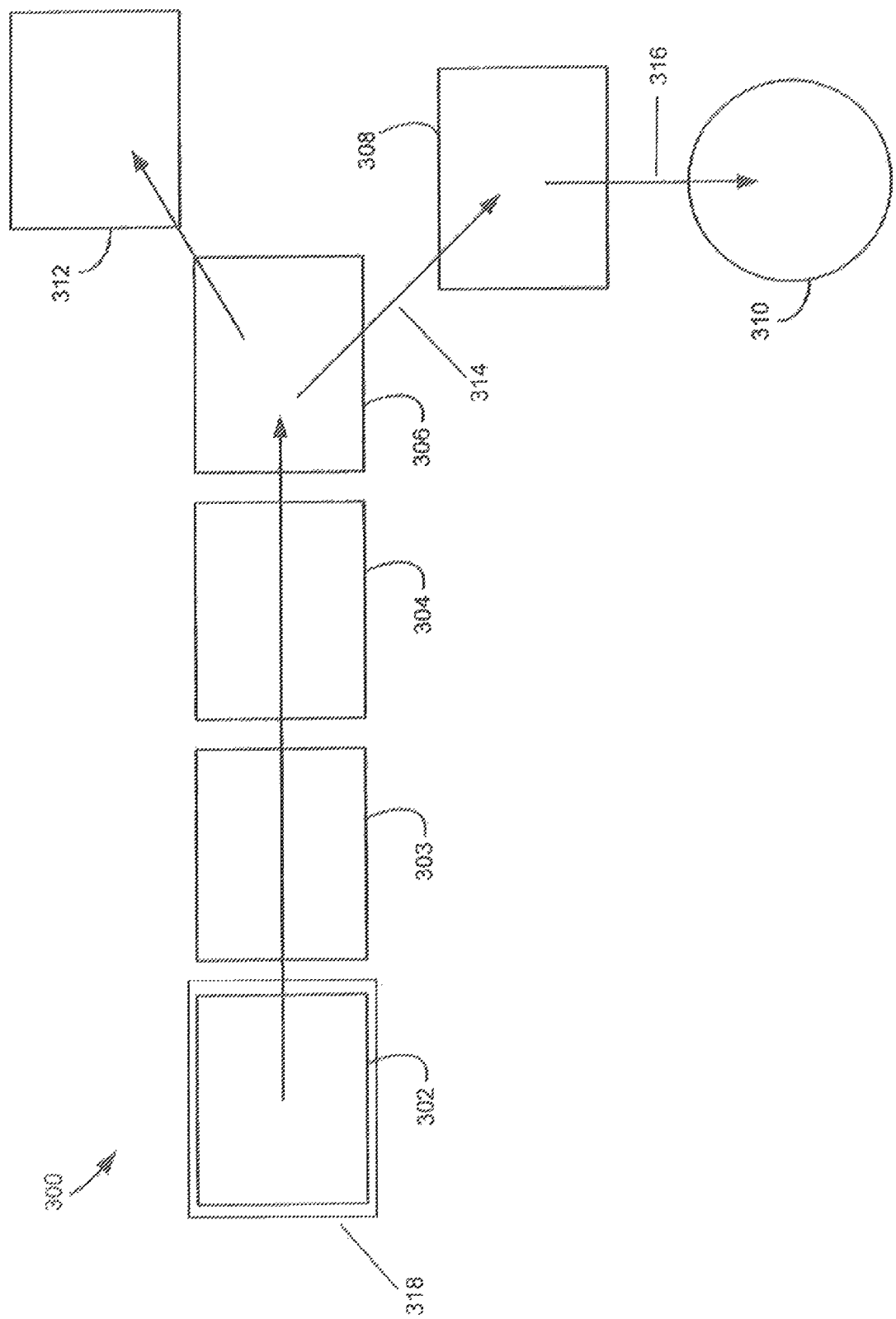
FIG. 3 illustrates a schematic of a braking and taxiing system in accordance with various embodiments.

With reference to FIG. 3, a functional diagram of aircraft braking and taxiing system 300 is shown. Processor 302 comprises a processor and a non-transitory storage computer readable medium that implements logic to control the parking brake system. Processor 302 may reside in a brake control unit 318. It is contemplated that multiple brake control units may be employed for redundancy purposes and the like. The brake control unit 318 may receive commands from one or more cockpit instruments. A cockpit instrument may comprise any instrument in the aircraft that allows for the input or display of a command or status. For example, a pedal in the cockpit may be operated by a pilot to produce braking commands. A lever, pedal, dial, switch, or other command input device may be used to command taxiing, including information such as desired taxi speed. Processor 302 may receive one or more commands from a cockpit instrument and provide output in accordance with the same. Processor 302 may also perform logic to verify the appropriateness of the received command. For example, a processor may receive a command for taxiing during landing (landing is known to occur through indicators such as weight on wheels, high wheel speed, and high concurrent braking command, among others). Processor 302 may thus determine that the command for taxiing is an error (e.g., human error or electrical error) and ignore the command.

A first clutch 314 couples high gear ratio transmission 306 with propulsion transmission 308. The first clutch 314 operates to selectively engage high gear ratio transmission 306 with propulsion transmission 308. Such engagement may be in response to commands from processor 302 or other aircraft components. A second clutch 316 couples propulsion transmission 308 with aircraft wheel 310. The second clutch 316 operates to selectively engage propulsion transmission 308 with aircraft wheel 310. Such engagement may be in response to commands from processor 302 or other aircraft components.

With reference to FIG. 3, a functional diagram of aircraft braking and taxiing system 300 is shown. Processor 302 comprises a processor and a non-transitory storage computer readable medium that implements logic to control the parking brake system. Processor 302 may reside in a brake control unit. It is contemplated that multiple brake control units may be employed for redundancy purposes and the like. The brake control unit may receive commands from one or more cockpit instruments. A cockpit instrument may comprise any instrument in the aircraft that allows for the input or display of a command or status. For example, a pedal in the cockpit may be operated by a pilot to produce braking commands. A lever, pedal, dial, switch, or other command input device may be used to command taxiing, including information such as desired taxi speed. Processor 302 may receive one or more commands from a cockpit instrument and provide output in accordance with the same. Processor 302 may also perform logic to verify the appropriateness of the received command. For example, a processor may receive a command for taxiing during landing (landing is known to occur through indicators such as weight on wheels, high wheel speed, and high concurrent braking command, among others). Processor 302 may thus determine that the command for taxiing is an error (e.g., human error or electrical error) and ignore the command.

Processor 302 commands motor drive 303. Motor drive 303 receives commands from processor 302 and produces drive signals for motor 304 in response to and in accordance with the command signals. Motor 304 receives the drive signals from motor drive 303 and causes motor 404 to turn in response to the drive signals. As discussed above, motor 304 is a brushless DC motor though the use of any electric motor is contemplated herein. Motor 304 provides a mechanical torque input into high gear ratio transmission 306. High gear ratio transmission 306 comprises a high gear ratio transmission, for example one in the range of 40:1 to 80:1.

The first clutch 314 couples high gear ratio transmission 306 with brake transmission 312. The first clutch 314 operates to selectively engage high gear ratio transmission 306 with brake clamping system 312. Such engagement may be in response to commands from processor 302 or other aircraft components. Brake clamping system 312 may comprise a ballscrew. In this regard, processor 302 may operate a brake in accordance with received input commands using the same electric motor used to provide a motive force for taxiing.

The first clutch couples high gear ratio transmission 306 with brake transmission 312. The first clutch operates to selectively engage high gear ratio transmission 306 with brake clamping system 312. Such engagement may be in response to commands from processor 302 or other aircraft components. Brake clamping system 312 may comprise a ballscrew. In this regard, processor 302 may operate a brake in accordance with received input commands using the same electric motor used to provide a motive force for taxiing.

Figure 4:
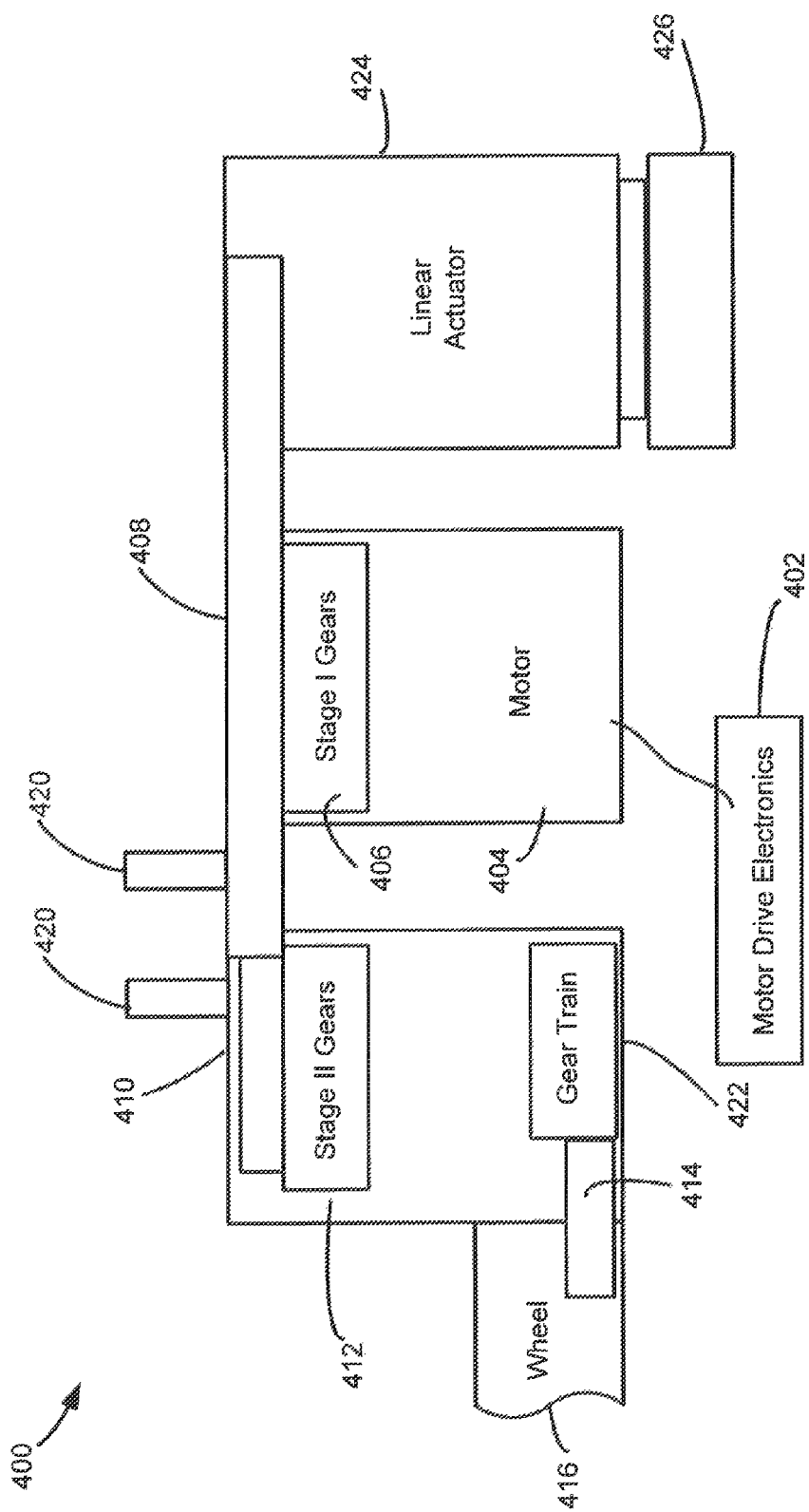
FIG. 4 illustrates a braking and taxiing in accordance with various embodiments.

With reference to FIG. 4, an exemplary braking and taxiing system 400 is shown. Motor drive electronics 402 may comprise a processor and a non-transitory storage computer readable medium that implements logic to control the braking and taxiing system. Motor drive electronics 402 may also comprise a motor driver that receives commands from a processor and produces drive signals for motor 404 in response to and in accordance with the command signals. Command signals may originate from one or more cockpit instruments. Motor 404 receives the drive signals from motor drive electronics 402 and causes motor 404 to turn in response to the drive signals. As discussed above, motor 404 may be a brushless DC motor though the use of any electric motor is contemplated herein.

Motor 404 provides a mechanical torque input into stage I gears 406. Stage I gears 406 is a component of a high gear ratio transmission that comprises stage I gears 406 and sun gear 408. Stage I gears 406 comprises a gear train having a high gear ratio. Stage I gears 406 transfers torque from motor 404 to sun gear 408. The gear ratio as measured from the input of stage I gears 406 to the output of sun gear 408 a high gear ratio transmission, for example one in the range of 40:1 to 80:1. Gear tooth sensors 420 may sense the rotational position of gear teeth. In that regard, the output of gear tooth sensors 420 may be used to determine when gear teeth align, which may then be used to actuate a clutch. As should be appreciated, the use of gear tooth sensors may be used within the context of any clutch disclosed herein.

A first clutch 410 couples sun gear 408 with stage II gears 412. Gear train 422 and stage II gears 412 comprise a propulsion transmission. The first clutch 410 operates to selectively engage sun gear 408 with stage II gears 412. Such engagement may be in response to commands from motor drive electronics 402 or other aircraft components.

Stage II gears 412 may couple with gear train 422. Second clutch 414 couples stage II gears 412 with aircraft wheel 416. Second clutch 414 operates to selectively engage gear train 422 with aircraft wheel 416. Such engagement may be in response to commands from motor drive electronics 402 or other aircraft components. In various embodiments, however, second clutch 414 is omitted. In such embodiments, aircraft wheel 416 receives power from stage II gears 412 in response to the coupling of sun gear 408 with stage II gears 412.

Aircraft wheel 416 may comprise one or more teeth configured to engage with stage II gears 412. The teeth of aircraft wheel 416 may be located along an inner portion of the rim of aircraft wheel 416, fir example, on or in a flange on aircraft wheel 416. In this regard, it is beneficial for the teeth of aircraft wheel 416 to be located at as near a large radius as possible to maximize torque applied to the wheel, as $\tau=F \times r$.

First clutch 410 couples sun gear 408 with linear actuator 424. Linear actuator 424 receives torque from sun gear 408 and converts the torque into linear force. Linear actuator 424 is a brake clamping system that may comprise a ballscrew and/or associated gearing. The linear force is applied to pressure plate 426. Pressure plate 426 in turn applies axial compressive force on a brake disk stack, opposing the rotation of aircraft wheel 416, thus effecting braking.

Figure 5:
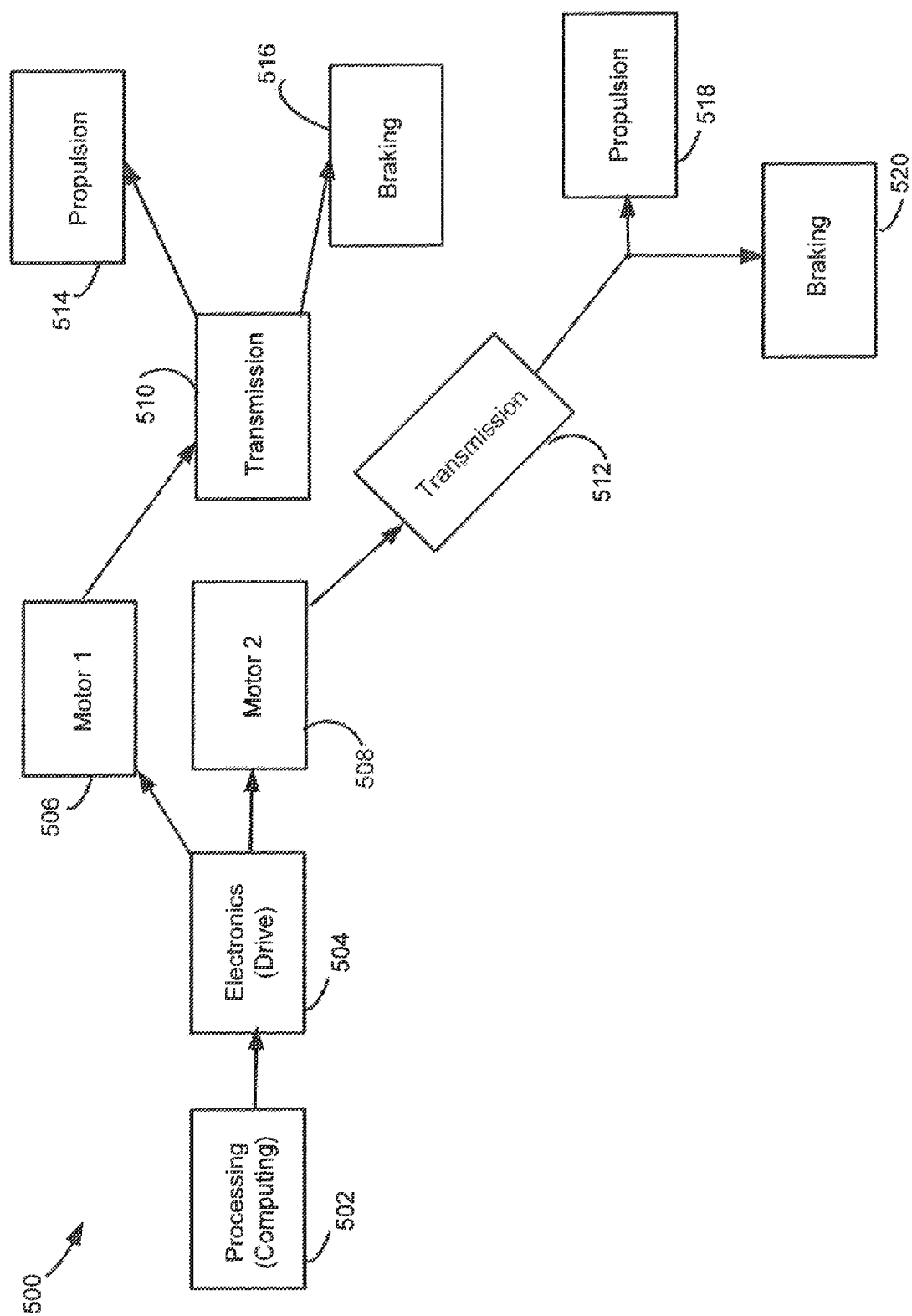
FIG. 5 illustrates a braking and taxiing system in accordance with various embodiments.

With reference to FIG. 5, a functional diagram of aircraft braking and taxiing system 500 is shown. Aircraft braking and taxiing system 500 comprises a system that may be coupled to a single wheel. Processor 502 comprises a processor and a non-transitory storage computer readable medium that implements logic to control the parking brake system. Processor 502 may reside in a brake control unit. It is contemplated that multiple brake control units may be employed for redundancy purposes and the like. The brake control unit may receive commands from one or more cockpit instruments. A cockpit instrument may comprise any instrument in the aircraft that allows for the input or display of a command or status. For example, a pedal in the cockpit may be operated by a pilot to produce braking commands. A lever, pedal, dial, switch, or other command input device may be used to command taxiing, including information such as desired taxi speed. Processor 502 may receive one or more commands from a cockpit instrument and provide output in accordance with the same. Processor 502 may also perform logic to verify the appropriateness of the received command. For example, a processor may receive a command for taxiing during landing (landing is known to occur through indicators such as weight on wheels, high wheel speed, and high concurrent braking command, among others). Processor 502 may thus determine that the command for taxiing is an error (e.g., human error or electrical error) and ignore the command.

Processor 502 commands electronic drive 504. Electronic drive 504 receives commands from processor 502 and produces drive signals for motors 506 and 508 in response to and in accordance with the command signals. It is contemplated that electronic drive 504 may drive one or more motors. In various embodiments, three motors may be coupled to each aircraft wheel, though in various embodiments at least four to six motors are used.

Motors 506 and 508 receive the drive signals from electronic drive 504 and cause motors 506 and 508 to turn in response to the drive signals. As discussed above, motors 506 and 508 are brushless DC motors though the use of any electric motor is contemplated herein. Motors 506 and 508 provide a mechanical torque input into transmissions 510 and 512, respectively. Transmissions 510 and 512 may comprise high gear ratio transmissions having gear ratios of, for example, in the range of 40:1 to 80:1.

A first clutch couples transmission 510 with propulsion transmission 514. The first clutch operates to selectively engage transmission 510 with propulsion transmission 514. Such engagement may be in response to commands from processor 502 or other aircraft components. Propulsion transmission 514 is engaged to an aircraft wheel via a mating portion of the aircraft wheel. For example, propulsion transmission 514 may comprise a gear that mated with a geared portion of the aircraft wheel.

The first clutch couples transmission 510 with brake transmission 516. The first clutch operates to selectively engage transmission 510 with brake transmission 516. Such engagement may be in response to commands from processor 502 or other aircraft components. Brake transmission 516 comprises a ballscrew that is coupled to a ram Rotational input from brake transmission 516 is converted to linear force by the ballscrew, which in turn exerts force upon a brake disk stack through the ram.

A second clutch couples transmission 512 with propulsion transmission 518. The second clutch operates to selectively engage transmission 512 with propulsion transmission 518. Such engagement may be in response to commands from processor 502 or other aircraft components. Propulsion transmission 518 is engaged to the same aircraft wheel as propulsion transmission 514 via a mating portion of the aircraft wheel.

The second clutch couples transmission 512 with brake transmission 520. The first clutch operates to selectively engage transmission 512 with brake transmission 520. Such engagement may be in response to commands from processor 502 or other aircraft components. Brake transmission 520 comprises a ballscrew that is coupled to a ram. Rotational input from brake transmission 520 is converted to linear force by the ballscrew, which in turn exerts force upon the brake disk stack through the ram. Both brake transmission 520 and brake transmission 516 exert force (through, for example a ballscrew), on the same brake disk stack.

Figure 6:
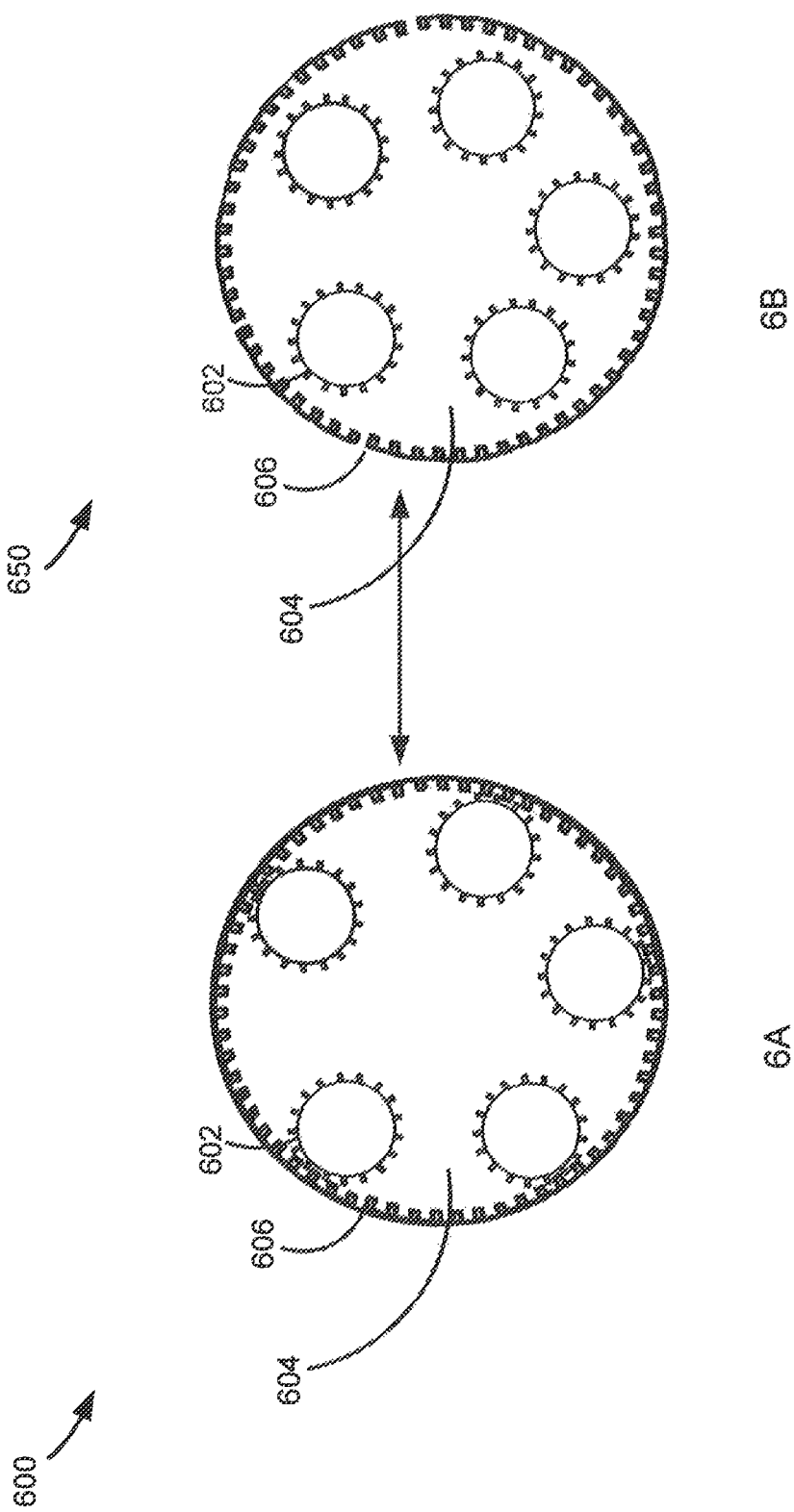
FIGS. 6A and 6B illustrates a braking and taxiing system as configured for an individual aircraft wheel in accordance with various embodiments.

With references to FIGS. 6A and 6B, exemplary engaged taxi position 600 and disengaged taxi position 650 are shown, respectively. Engaged taxi position 600, shown in FIG. 6A, may comprise propulsion transmissions 602 engaged with mating portion 604 of aircraft wheel 606. Mating portion 604 of aircraft wheel 606 comprises a geared portion. Propulsion transmissions 602 comprise gears that are selectively engaged with mating portion 604. In such position, an electric motor may provide a motive force to effect taxiing.

Disengaged taxi position 650, shown in FIG. 6B, comprises propulsion transmissions 602 disengaged from mating portion 604 of aircraft wheel 606. Propulsion transmissions 602 comprise gears that are selectively disengaged with mating portion 604. In such position, the electric motor may not provide a motive force to effect taxiing.

In various embodiments, during taxiing, a pilot may cease to command further taxiing, but not command braking. Accordingly, the pilot intends to allow the aircraft to "coast." In various embodiments, the electric motor remains mechanically engaged with aircraft wheel. In this regard, the reflected inertia of the electric motor provides a braking effect on the aircraft wheel. In various embodiments, however, the electric motor may disengage from the aircraft wheel, for example by shifting into a neutral position. Thus, aircraft wheel is allowed to rotate without the reflected inertia of the electric motor, and thus allowing the aircraft wheel to coast without the braking force provided by the electric motor.

Transmissions disclosed herein may internally comprise one or more clutches. Moreover, transmissions disclosed herein may comprise the ability to variably adjust the final gear ratio. Such adjustment may be accomplished using any suitable configuration. For example, internal clutches may be used to select different gears internally to affect final gear ratio. Further, continuously variable mechanisms may be used to change final gear ratio. A propulsion transmission may have two variable gear ratios. The first variable gear ratio of a propulsion transmission may be a "low" gear intended to bring an aircraft from a stopped position into motion. The second variable gear ratio of a propulsion transmission may be a "high" gear intended to maintain the aircraft within a particular speed range. However, in various embodiments, a continuously variable propulsion transmission may be used. Variable adjustment of final gear ratio may be controlled electronically and/or mechanically and/or hydraulically. The aforementioned features may be included in any transmission disclosed herein to tune final gear ratio, input/output torque and input/output rotational velocity. While the transmissions disclosed herein may be primarily comprised of gears, the transmissions contemplated herein may include one or more other modes of torque transmission such as belts, chains, levers, pulleys, and the like.

In various embodiments, as described above, a clutch may be engaged or disengaged based upon input from one or more gear tooth sensors or the like. A gear tooth sensor may sense the position of a gear tooth, for example, using a Hall Effect type sensor. The gear tooth position information may be sent to the brake control unit for processing. At a moment when two gears align, the clutch may be engaged to mate the two gears together. In this regard, a smooth shift is accomplished. Thus, any gear contemplated herein may have an associated gear tooth sensor which may facilitate the engagement and disengagement of a clutch that selectively couples two or more gears.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising:
an electric motor coupled to a first transmission;
a first clutch for selectively engaging the first transmission to a propulsion transmission or a brake clamping system,
wherein, in response to engagement with the propulsion transmission, the electric motor drives an aircraft wheel,
wherein, in response to engagement with the brake clamping system, the electric motor drives the brake clamping system to apply force to an aircraft brake disk stack.

2. The system of claim 1, wherein the brake clamping system comprises a ballscrew and a ram.

3. The system of claim 2, wherein the brake clamping system comprises a second transmission coupled to the ballscrew.

4. The system of claim 1, wherein the first clutch includes a neutral position, wherein, in response to engagement in the neutral position, the first transmission is not in engagement with the brake clamping system and not in engagement with the propulsion transmission.

5. The system of claim 1, wherein the first transmission is a high gear ratio transmission.

6. The system of claim 1, wherein the first transmission includes a planetary gear set.

7. The system of claim 3, wherein at least one of the propulsion transmission and the second transmission have variable gear ratios.

8. The system of claim 1, wherein a brake control unit provides a command to the electric motor.

9. The system of claim 1, wherein the brake control unit receives input.

10. A system comprising:
an aircraft wheel comprising a mating portion for mating with a propulsion transmission, the aircraft wheel coupled to an aircraft brake;
the aircraft brake comprising a brake clamping system for selectively engaging a brake disk stack;
a rotating member;
a first clutch for selectively engaging the rotating member to a propulsion transmission or the brake clamping system;
wherein, in response to engagement with the aircraft wheel, the rotating member drives the aircraft wheel,
wherein, in response to engagement with the brake clamping system, the rotating member drives the brake clamping system to apply force to the aircraft brake disk stack.

11. The system of claim 10, wherein the brake clamping system comprises a ballscrew and a ram.

12. The system of claim 10, wherein the brake clamping system comprises a second transmission coupled to the ballscrew.

13. The system of claim 10, wherein the first clutch includes a neutral position, wherein, in response to engagement in the neutral position, the first transmission is not in engagement with the brake clamping system and not in engagement with the propulsion transmission.

14. The system of claim 10, wherein the mating portion comprises a geared portion.

15. The system of claim 10, wherein at least one of the propulsion transmission and the second transmission have variable gear ratios.

16. The system of claim 10, wherein the rotating member is driven by an electric motor.

* * * * *